United States Patent
Roetker (10) Patent No.: US 11,885,063 B2
(45) Date of Patent: Jan. 30, 2024

(54) MICROFIBER FILTRATION SYSTEM

(71) Applicant: Haier US Appliance Solutions, Inc., Wilmington, DE (US)

(72) Inventor: John Joseph Roetker, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/503,538

(22) Filed: Oct. 18, 2021

(65) Prior Publication Data

US 2023/0123507 A1  Apr. 20, 2023

(51) Int. Cl.
| | | |
|---|---|---|
| D06F 39/10 | (2006.01) | |
| B01D 35/30 | (2006.01) | |
| D06F 23/04 | (2006.01) | |
| D06F 39/08 | (2006.01) | |
| D06F 23/02 | (2006.01) | |
| B01D 29/05 | (2006.01) | |

(52) U.S. Cl.
CPC .............. *D06F 39/10* (2013.01); *B01D 29/05* (2013.01); *B01D 35/30* (2013.01); *D06F 23/025* (2013.01); *D06F 23/04* (2013.01); *D06F 39/085* (2013.01)

(58) Field of Classification Search
CPC ...... D06F 39/02; D06F 39/022; D06F 39/028; D06F 39/08; D06F 39/083; D06F 39/085; D06F 39/10; D06F 2105/34; B01D 2221/00

See application file for complete search history.

(56) References Cited

U.S. PATENT DOCUMENTS

| | | | |
|---|---|---|---|
| 2004/0134865 A1* | 7/2004 | Sharkey | B01D 29/6438 210/797 |
| 2012/0024773 A1* | 2/2012 | Morrison | D06F 39/10 134/109 |
| 2014/0165665 A1* | 6/2014 | Del Pos | D06F 39/007 68/200 |
| 2021/0062382 A1* | 3/2021 | Andrejczuk | D06F 17/10 |

FOREIGN PATENT DOCUMENTS

| | | | | |
|---|---|---|---|---|
| EP | 2325376 B1 * | 7/2016 | | D06F 39/02 |
| EP | 3696311 A1 | 8/2020 | | |
| EP | 3789530 A1 | 3/2021 | | |

(Continued)

*Primary Examiner* — David G Cormier
(74) *Attorney, Agent, or Firm* — Dority & Manning, P.A.

(57) ABSTRACT

A laundry appliance includes a cabinet, a tub, and a pump for recirculating wash fluid from the tub to a filter container. The filter container includes a fluid inlet in fluid communication with the pump and fluid outlet in fluid communication with the tub. The filter container also includes a filter housing for directing wash fluid from the fluid inlet to the fluid outlet. A self-clearing filter assembly is provided within the filter housing. The self-clearing filter includes side walls and a filter base having at least one inclined surface. The self-clearing filter is situated such that the inclined surface is below the fluid inlet. The self-clearing filter prevents microfibers and other debris from passing through to the outlet of the filter container. Simultaneously, the force of the wash fluid on the inclined surface forces the microfibers and other debris to a trough, where it can be collected and disposed of.

20 Claims, 7 Drawing Sheets

(56) References Cited

FOREIGN PATENT DOCUMENTS

| EP | 3842586 A1 * | 6/2021 | ........ A61M 5/14216 |
|----|----|----|----|
| WO | WO-2020251508 A1 * | 12/2020 | ............. D06F 39/10 |
| WO | WO 2021032986 A1 | 2/2021 | |
| WO | WO 2021070102 A1 | 4/2021 | |
| WO | WO-2021070103 A1 * | 4/2021 | ............. B01D 29/15 |

* cited by examiner

MICROFIBER FILTRATION SYSTEM

FIELD OF THE INVENTION

The present subject matter relates generally to the laundry appliances, and more particularly to a microfiber filtration system for laundry appliances.

BACKGROUND OF THE INVENTION

Laundry appliances generally include a cabinet which receives a tub for containing wash and rinse water to perform a washing operation. A wash basket may be rotatably mounted within the wash tub. A drive assembly may be coupled to the wash tub and configured to rotate the wash basket within the wash tub in order to cleanse articles within the wash basket. Upon completion of a wash cycle, a pump assembly can be used to rinse and drain soiled water to a draining system. The draining system in conventional laundry appliances generally pumps the soiled water out of the laundry appliance as waste water into a sewer system or septic tank.

Synthetic and natural fibers from textiles release microfibers. Thus, during each wash cycle, these microfibers are transmitted to the waste water system and ultimately to the aquatic environment via laundry appliance effluent. The released fibers have become of increasing interest over concerns for effects on marine life and contamination of the human food supply.

Several efforts to filter out such microfibers have been made. In some such efforts, filter screens are employed and soiled water from the washing machine is forced through such screens. However, such designs are plagued by clogging from accumulation of the microfibers, hair, and other particulates, and either force a shutdown of the laundry appliance operations or simply overflow, allowing microfibers to bypass the filter. Such designs are unacceptable to most users or ineffective. Other efforts employ centrifuges to separate the microfibers from the wash effluent. However, such designs can be costly with the addition of material parts and assembly. Accordingly, a laundry appliance with a simple, effective filter for removal of microfibers prior to discharge of waste water that is not prone to clogging would be desirable.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a laundry appliance is provided. The laundry appliance may define a vertical direction, a lateral direction, and a transverse direction and may include a cabinet, a tub provided within the cabinet, a pump, and a filter container. The tub may include a tub inlet and a tub outlet. The pump may be in fluid communication with the outlet of the tub for circulating a fluid volume. The filter container may further include a filter container inlet, a filter container outlet, a filter housing, and a self-clearing filter for separating microfibers from the fluid volume. The filter container inlet may be in fluid communication with the pump. The filter housing may be configured such that the fluid volume entering the fluid container inlet is directed to the fluid container outlet by force of gravity. The self-clearing filter may further include one or more filter side wall forming a side wall perimeter and a filter base. The one or more filter side walls may have an upper end and a lower end. The filter base may be attached to the lower end of the one or more side walls. The filter base may also have at least one surface that is inclined such that the filter base includes an upper portion and a lower portion, wherein the upper portion of the filter base is orienting below the filter container inlet.

In another exemplary aspect of the present disclosure, a filter container is provided. The filter container may include a filter container inlet, a filter container outlet, a filter housing, and a self-clearing filter for separating microfibers from the fluid volume. The filter container inlet may be in fluid communication with the pump. The filter housing may be configured such that the fluid volume entering the fluid container inlet is directed to the fluid container outlet by force of gravity. The self-clearing filter may further include one or more filter side wall forming a side wall perimeter and a filter base. The one or more filter side walls may have an upper end and a lower end. The filter base may be attached to the lower end of the one or more side walls. The filter base may also have at least one surface that is inclined such that the filter base includes an upper portion and a lower portion, wherein the upper portion of the filter base is orienting below the filter container inlet.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
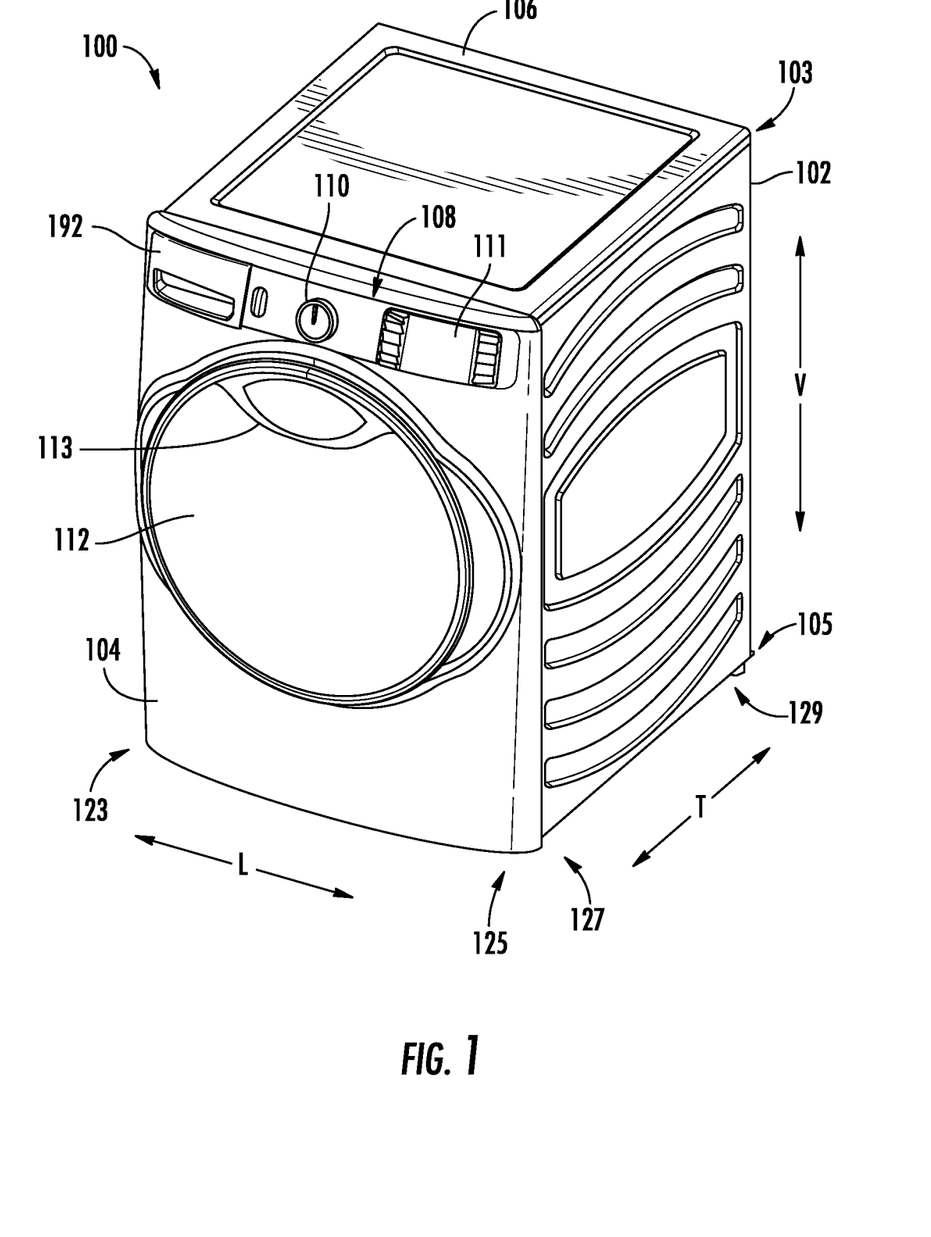
FIG. 1 provides a front perspective view of a laundry appliance according to exemplary embodiments of the present disclosure.
Figure 2:
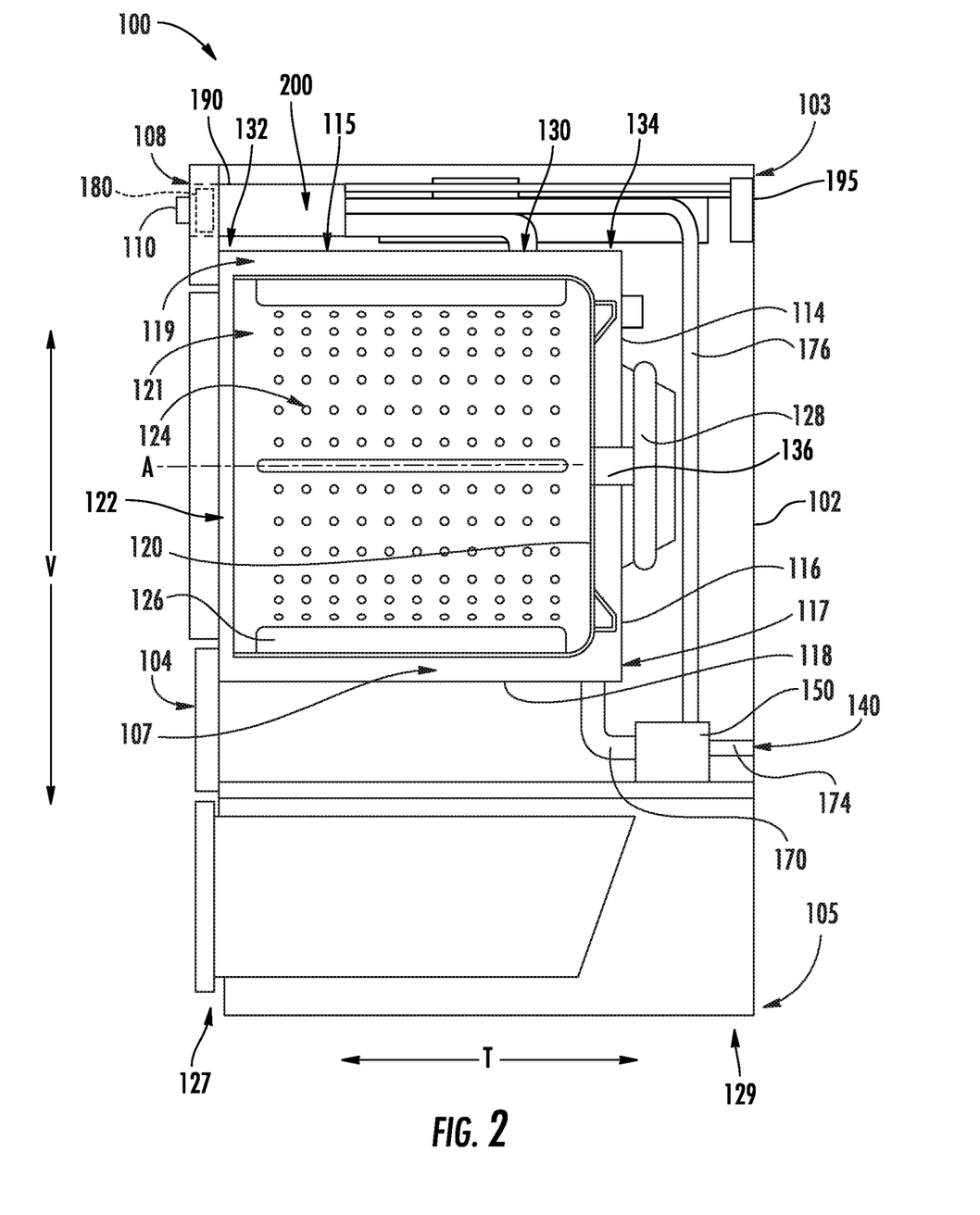
FIG. 2 provides a side schematic view of the exemplary laundry appliance of FIG. 1.

FIGS. 1 and 2 provide various views of an exemplary horizontal axis, front-loading laundry appliance 100 according to one exemplary embodiment of the present disclosure. For instance, laundry appliance 100 may perform each of a wash cycle or operation and a drying cycle or operation. In particular, FIG. 1 provides a front, perspective view of horizontal axis laundry appliance 100 and FIG. 2 provides a side, section view of laundry appliance 100. As shown in FIG. 1, laundry appliance 100 includes a cabinet 102 that extends between a top 103 and a bottom 105, e.g., along a vertical direction V. Cabinet 102 also extends between a first side 123 and a second side 125, e.g., along a lateral direction L, and between a front 127 and a rear 129, e.g., along a transverse direction T. The vertical, lateral, and transverse directions V, L, T defined by laundry appliance 100 are mutually perpendicular and together define an orthogonal direction system.

Cabinet 102 includes a front panel 104. A door 112 is mounted to front panel 104 and is rotatable between an open position (not shown) facilitating access to a wash drum or basket 120 (FIG. 2) located within cabinet 102, and a closed position (shown in FIGS. 1 and 2) hindering access to basket 120. A user may pull on a handle 113 in order to selectively adjust door 112 between the open and closed positions. Cabinet 102 also includes a top panel 106 positioned at top 103 of cabinet 102.

A control panel 108 including a plurality of input selectors 110 is coupled to front panel 104. Control panel 108 and input selectors 110 collectively form a user interface input for operator selection of machine cycles and features. For example, in some embodiments, control panel 108 includes a display 111 (FIG. 1) configured to present or indicate selected features, a countdown timer, and/or other items of interest to machine users.

As shown in FIG. 2, a tub 114 defines a wash fluid compartment 119 configured for receipt of a washing fluid. Thus, tub 114 is configured for containing washing fluid, e.g., during operation of laundry appliance 100 (e.g., a wash cycle or operation). Washing fluid disposed within tub 114 may include, for example, at least one of water, fabric softener, bleach, and detergent. Tub 114 includes a back wall 116 and a sidewall 118 and extends between a top 115 and a bottom 117, e.g., along the vertical direction V. Further, tub 114 extends between a front 132 and a rear 134, e.g., along the transverse direction T.

Basket 120 is rotatably mounted within tub 114 in a spaced apart relationship from tub sidewall 118 and tub back wall 116. One or more bearing assemblies may be placed between basket 120 and tub 114 and may allow for rotational movement of basket 120 relative to tub 114. Basket 120 defines a wash chamber 121 and an opening 122. Opening 122 of basket 120 permits access to wash chamber 121 of basket 120, e.g., in order to load articles into basket 120 and remove articles from basket 120. Basket 120 also defines a plurality of perforations 124 to facilitate fluid communication between an interior of basket 120 and tub 114. A sump 107 is defined by tub 114 and is configured for receipt of a washing fluid volume during operation of appliance 100. For example, during operation of appliance 100 (e.g., the wash cycle), washing fluid may be urged by gravity from basket 120 to sump 107 through plurality of perforations 124.

A spout 130 is configured for directing a flow of fluid into tub 114, thus forming a tub inlet. Spout 130 may be in fluid communication with a water supply (not shown) in order to direct fluid (e.g., clean water) into tub 114. A pump assembly 150 (shown schematically in FIG. 2) is located beneath tub 114 for draining tub 114 of fluid. Pump assembly 150 is in fluid communication with sump 107 of tub 114 via a conduit 170, wherein sump 107 constitutes a tub outlet. Thus, conduit 170 directs fluid from tub 114 to pump assembly 150. Pump assembly 150 is also in fluid communication with a drain 140 via piping 174. Pump assembly 150 can urge fluid disposed in sump 107 to drain 140 during operation of appliance 100 in order to remove fluid from tub 114. Fluid received by drain 140 from pump assembly 150 is directed out of appliance 100, e.g., to a sewer or septic system.

In addition, pump assembly 150 is configured for recirculating washing fluid within tub 114. Thus, pump assembly 150 is configured for urging fluid from sump 107, e.g., to filter container 200, as further described herein. For example, pump assembly 150 may urge washing fluid in sump 107 to filter container 200 via hose 176 during operation of appliance 100 in order to clean microfibers for the wash fluid and assist in cleaning articles disposed in basket 120. It should be understood that conduit 170, piping 174, and hose 176 may be constructed of any suitable mechanism for directing fluid, e.g., a pipe, duct, conduit, hose, or tube, and are not limited to any particular type of mechanism.

A motor 128 is in mechanical communication with basket 120 in order to selectively rotate basket 120, e.g., during an agitation or a rinse cycle of laundry appliance 100 as described below. In particular, a shaft 136 mechanically couples motor 128 with basket 120 and drivingly rotates basket 120 about a shaft or central axis A, e.g., during a spin cycle. Ribs 126 extend from basket 120 into wash chamber 121. Ribs 126 assist agitation of articles disposed within wash chamber 121 during operation of laundry appliance 100. For example, ribs 126 may lift articles disposed in basket 120 during rotation of basket 120.

As further shown in FIG. 2, laundry appliance 100 includes a dispenser assembly 190. Dispenser assembly 190 includes features for receiving various wash treatment additives (e.g., fluid detergent, powder detergent, fabric softener, bleach, powder or any other suitable liquid) and dispensing or directing them to wash fluid compartment 119 of tub 114 during operation of laundry appliance 100. Dispenser assembly 190 may, in certain embodiments, be incorporated into a filter container 200, as will be described in further detail below. Dispenser assembly 190 may include a drawer configured to store one or more of the various wash treatment additives. In detail, one or more of the additives may be added during either or both of a wash cycle and a drying cycle.

Operation of laundry appliance 100 may be controlled by a processing device or controller 180 that is operatively coupled to control panel 108 for user manipulation to select washing and/or drying cycles and features. In response to user manipulation of control panel 108, controller 180 may operate the various components of laundry appliance 100 to execute selected machine cycles and features.

Controller 180 may include a memory and microprocessor, such as a general or special purpose microprocessor operable to execute programming instructions or microcontrol code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 180 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 108 and other components of laundry appliance 100 may be in communication with controller 180 via one or more signal lines or shared communication busses.

In an illustrative example of operation of laundry appliance 100, laundry items are loaded into basket 120, and washing operation is initiated through operator manipulation of input selectors 110. Tub 114 is filled with water and one or more wash treatment additives from dispenser assembly 200 to form a wash fluid. One or more valves of a water inlet valve 195 can be actuated by controller 180 to provide for filling tub 114 to the appropriate level for the amount of articles being washed. Water inlet valve 195 is in fluid communication with a water source, such as e.g., a hot water heater and/or a municipal water line. Once tub 114 is properly filled with wash fluid, the contents of basket 120 are agitated with ribs 126 for cleansing of laundry items in basket 120.

After the agitation phase of the wash cycle is completed, tub 114 is drained. Laundry articles can then be rinsed by again adding wash fluid to tub 114 depending on the particulars of the cleaning cycle selected by a user, and ribs 126 may again provide agitation within wash chamber 121. One or more spin cycles may also be used. In particular, a spin cycle may be applied after the wash cycle and/or after the rinse cycle in order to wring wash fluid from the articles being washed. During a spin cycle, basket 120 is rotated at relatively high speeds.

Upon completion of the wash cycle, laundry appliance 100 may perform a drying cycle. For instance, after the spin cycle is completed and excess wash fluid and/or water has been drained from the tub, laundry appliance may begin the drying cycle (e.g., circulating air through tub 114 and/or wash chamber 121). The drying cycle may be performed automatically upon completion of the wash cycle, or may be initiated separately by the user upon the completion of the wash cycle. In at least one embodiment, the drying cycle commences automatically within a predetermined amount of time after the completion of the wash cycle (e.g., by utilizing additives provided in the dispenser assembly 190).

While described in the context of a specific embodiment of horizontal axis laundry appliance 100, it will be understood that horizontal axis laundry appliance 100 is provided by way of example only. Other laundry appliances having different configurations, different appearances, and/or different features may also be utilized with the present subject matter as well, including, for example, vertical axis laundry appliances. Thus, the teachings of the present disclosure are not limited to use with laundry appliance 100.

Figure 3:
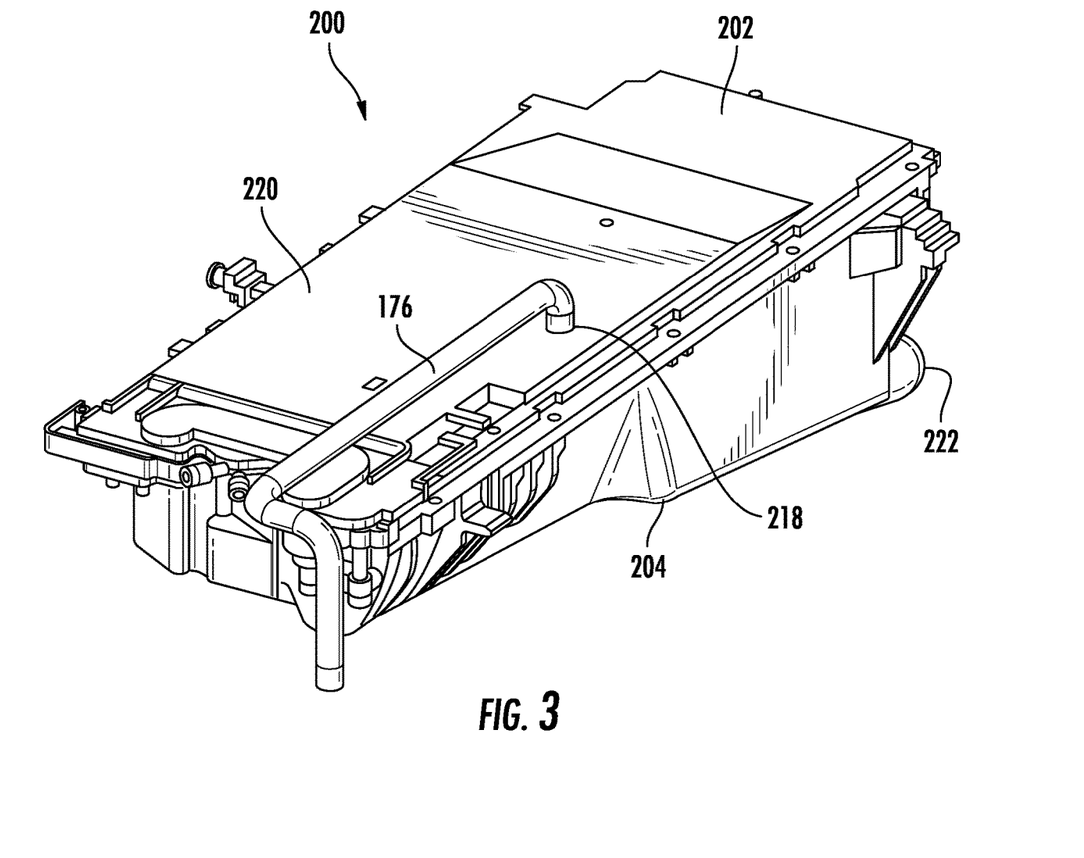
FIG. 3 provides a rear perspective view of a filter container according to exemplary embodiments of the present disclosure.
Figure 4:
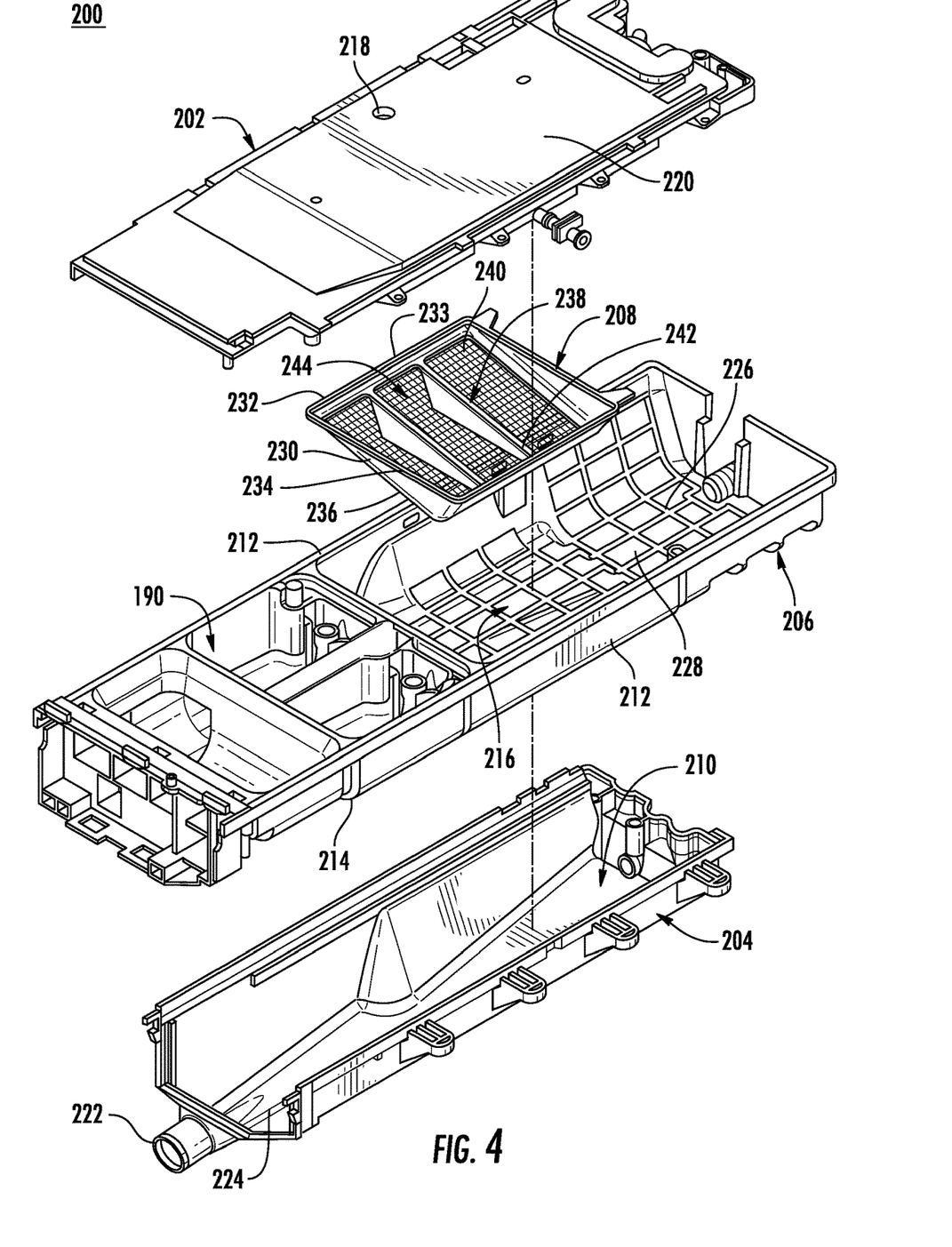
FIG. 4 provides an exploded view of the filter container of FIG. 3.

Turning now to FIGS. 3 and 4, a filter container 200 according to one or more embodiments of the present disclosure will be described in detail. According to the present disclosure, the described filter container may be incorporated into a variety of laundry treatment apparatuses. For instance, filter container 200 may be installed within a front-load washing machine, a top-load washing machine, or a combination washing machine and dryer. Advantageously, the features of the described filter container assembly may enable the removal of microfibers while discouraging clogging. However, additional uses will be apparent to one having ordinary skill in the art.

Filter container 200 may include a filter container cover 202, a filter container base 204, a filter container housing 206, and a self-clearing filter assembly 208, as illustrated in the embodiment of FIG. 4. Filter cover 202 may be attached to filter container base 204. The combination of filter container cover 202 and filter container base 204 defines a filter container interior 210. Filter container housing 206 is situated within filter container interior 210. Filter housing 206 further includes one or more side walls 212 and a bottom 214 that define a filter seat 216. Self-clearing filter assembly 208 is removably seated within filter seat 216. As explained herein, filter container 200 and dispenser assembly 190 may form a single unit, as shown in FIG. 4. In alternative embodiments, filter container 200 and dispenser assembly 190 may be separate components. Further, filter container 200, either in combination with or independent from dispenser assembly 190, may constitute or form part of a slideable drawer 192 (FIG. 1). Drawer 192 may slide in and out of front panel 104 of laundry appliance 100 for ease of access to filter container 200.

Filter container cover 202 covers the top of filter container 210 and includes a filter container inlet 218. Filter container inlet 218 is an opening that passes through filter container cover 202 that is in fluid communication with pump 150 via hose 176. Filter container inlet 218 is situated above self-clearing filter assembly 208, as further described herein. In some embodiments, filter container cover may further include a movable cover door 220. Cover door 220 may, in some embodiments, pivot along one side in order to allow access to filter container interior 210 to enable removal of self-clearing filter assembly for cleaning, as described herein. In alternative embodiments, cover door 220 may slide to permit such access. In still other embodiments, cover door 220 may not be fixedly attached, but rather may be fully removable, for example through employment of snap fit connections, screws, or other easily removable attachment means. In still other alternative embodiments, filter container cover 202 may lack cover door 220 entirely, but filter container cover 202 may itself be movable with respect to filter container base 204 to allow access to filter container interior 210.

Filter container base 204 may include a filter container outlet 222. Filter container base 204 may further include an inclined or curved floor 224 that angles downward toward filter container outlet 222. In this fashion, gravity forces fluids passing through filter container 200 toward and through filter container outlet 222. Filter container base 204 may be attached to filter container cover 202 by any known conventional mechanism, such as screws, bolts, rivets, and the like.

Filter container housing 206 may include a housing floor 226. Housing floor 226 may include one or more perforations 228. In this manner, fluids passing through filter container 200 are able to easily pass through perforations 228 and down to filter container base 204, where the fluids are directed out of filter container 200 through filter container outlet 222, as previously described. As previously noted, filter container housing 206 may constitute or form part of slideable drawer 192. In such embodiments, a housing cover (not pictured) may be attached to filter container housing 206 to generally conceal or contain portions of the interior of filter container housing 206 when it slides at least partially outside of filter container 200. The housing cover may include an opening above self-clearing filter assembly 208, as further described herein, to permit fluid to pass through the housing cover. In some embodiments, the housing cover may be hingedly attached to filter container housing 206 to ease access for removal or cleaning of self-clearing filter assembly 208. In alternative embodiments, the housing cover may be attached filter container housing 206 by snapping into place, or by other similar techniques that allow for quickly and easily removing the housing cover to access the self-clearing filter assembly 208. In still other embodiments, the housing cover may include a moveable lid (e.g., pivotable or slideable) for granting access to self-clearing filter assembly 208.

Self-clearing filter assembly 208 is provided for separating microfibers from the fluid volume passing through filter container 200. Self-clearing filter assembly 208 may include one or more filter side walls 230 forming a filter perimeter 232. Filter perimeter 232 may be rectangular, as shown in FIG. 4. In alternative embodiments, filter perimeter 232 may be circular, as illustrated in FIGS. 5B and 5C, or may taken any other shape that enables it to be removably seated in filter seat 216 and which is otherwise consistent with the present disclosure.

The quantity of filter side walls 230 depends on the shape of filter perimeter 232. For example, self-clearing filter assemblies 208 having square or rectangular filter perimeters 232 may include four filter side walls 230. Additionally, self-clearing filter assemblies 208 having circular, elliptical, or ovoid shapes may include a single filter side wall 230. Other shapes may require a different number of filter side walls 230. Irrespective of the quantity, each filter side wall 230 includes an upper end 234 and a lower end 236, wherein the upper end 234 defines, at least in part, filter perimeter 232. Upper end 234 of filter side walls 230 may include a weir 233 (i.e., a dam for directing the flow of a fluid volume) such that a portion of filter perimeter 232 is higher than another portion of filter perimeter 232, proving a directed outlet for any overflow. In other embodiments, filter perimeter 232 has a uniform height and any overflow may simply spill over any point of filter perimeter 232. In embodiments without weir 233, self-clearing filter assembly 208 is smaller than filter container housing 206 in at least one of the lateral or transverse directions to permit an overflow in self-clear filter assembly 208 to spill into and through filter container housing 206.

Self-clearing filter assembly 208 may further include a filter base 238. Filter base 238 is attached to lower end 236 of filter side walls 230. In the preferred embodiment, filter base 238 includes, at least in part, a mesh screen 240. Mesh screen 240 may filter items as small as 80-100 microns in the preferred embodiments, however the present disclosure is not intended to be so limiting. In certain embodiments, self-clearing filter assembly 208 may further include ribs 242, spanning from one filter side wall 230 to an opposing filter side wall 230 (or from one side of a single filter side wall 230 to the opposing side, where only such filter side wall 230 is present). Ribs 242 may add support to filter base 238 and stability to self-clearing filter assembly 208 in embodiments employing such ribs 242.

Figure 5A:
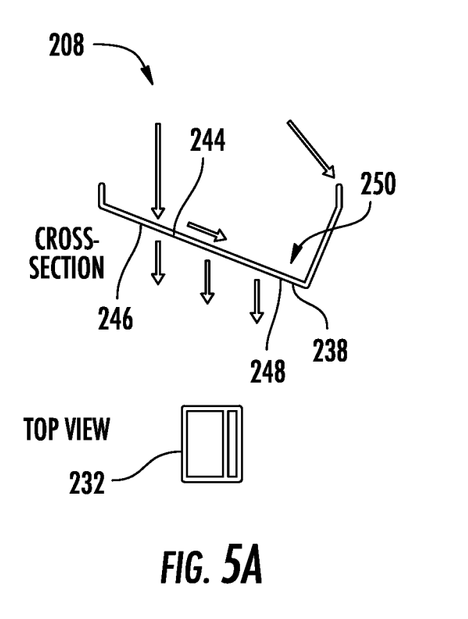
FIG. 5A provides a cross-section and top view of a filter according to exemplary embodiments of the present disclosure.
Figure 5B:
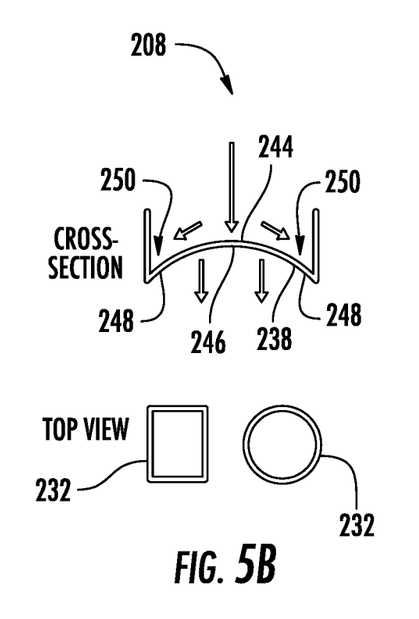
FIG. 5B provides a cross-section and top view of an alternative filter according to exemplary embodiments of the present disclosure.
Figure 5C:
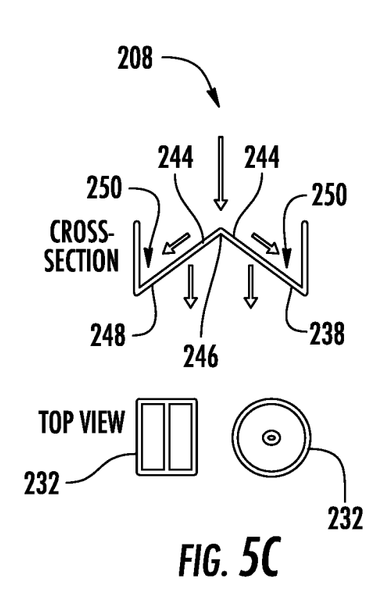
FIG. 5C provides a cross-section and top view of yet another alternative filter according to exemplary embodiments of the present disclosure.

Filter base 238 may include one or more surfaces 244, as illustrated in the embodiments of FIGS. 5A-5C. Surfaces 244 may be inclined such that filter base 238 includes an upper portion 246 and a lower portion 248. As used herein, the term inclined is intended to apply to both angled planar surfaces and curved or arced surfaces, such as illustrated in FIG. 5B. As a result of this inclined surface, filter base 238 and one or more filter side walls 230 define one or more troughs 250 at lower end 236 of filter side walls 230 for collection of microfibers and other debris, as further described herein.

Self-clearing filter assembly 208 and filter container inlet 218 are situated such that upper portion 246 of filter base 238 is oriented below filter container inlet 218. In this fashion, the wash fluid volume entering filter container 200 is deposited onto upper portion 246 of filter base 238. A portion of the fluid volume passes through mesh screen 240 of filter base 238, filtering microfibers and other debris from this portion of the fluid volume. This portion of the fluid volume passes through the one or more perforations 228 in filter container housing 206 into filter container base 204, where the fluid volume exits filter container 200 via filter container outlet 222.

Due to the small openings within mesh screen 240, a significant portion of the fluid volume entering filter container 200 from filter container inlet 218 does not pass through mesh screen 240. Instead, the fluid volume flows down inclined surface 244 toward trough 250. The portion of the fluid volume flowing over surface 244 drives microfibers and other debris previously filtered along surface 244 and into trough 250, where it is trapped, thus self-clearing surface 244 and discouraging buildup that may lead to clogging. The fluid volume flowing along surface 244 then drains through mesh screen 240 at lower portion 248 of filter base 238 and exits filter container 200 through filter container outlet 222, as previously described. Filter container outlet 222 is in fluid communication with spout 130, thus enabling the filtered water volume exiting fluid container outlet 222 to be reintroduced into tub 114. The fluid volume is soiled during a wash cycle, where it exits tub 114 via sump 107, as explained herein. Pump 150 may then be used to recirculate the fluid to filter container inlet 218 for filtering.

As previously described, self-clearing filter assembly 208 may be periodically removed and the debris cleaned out. Even in the absence of cleaning, however, as debris accumulates, the fluid volume flow along surface 244 will simply terminate at the point that it meets the debris, which may be higher on surface 244 if accumulation is high. Ultimately, if the level of debris rises above the point at which the fluid volume contacts upper end 234 of filter side wall 230 and becomes compacted, the fluid volume will be permitted to overflow, as previously described herein.

Figure 6:
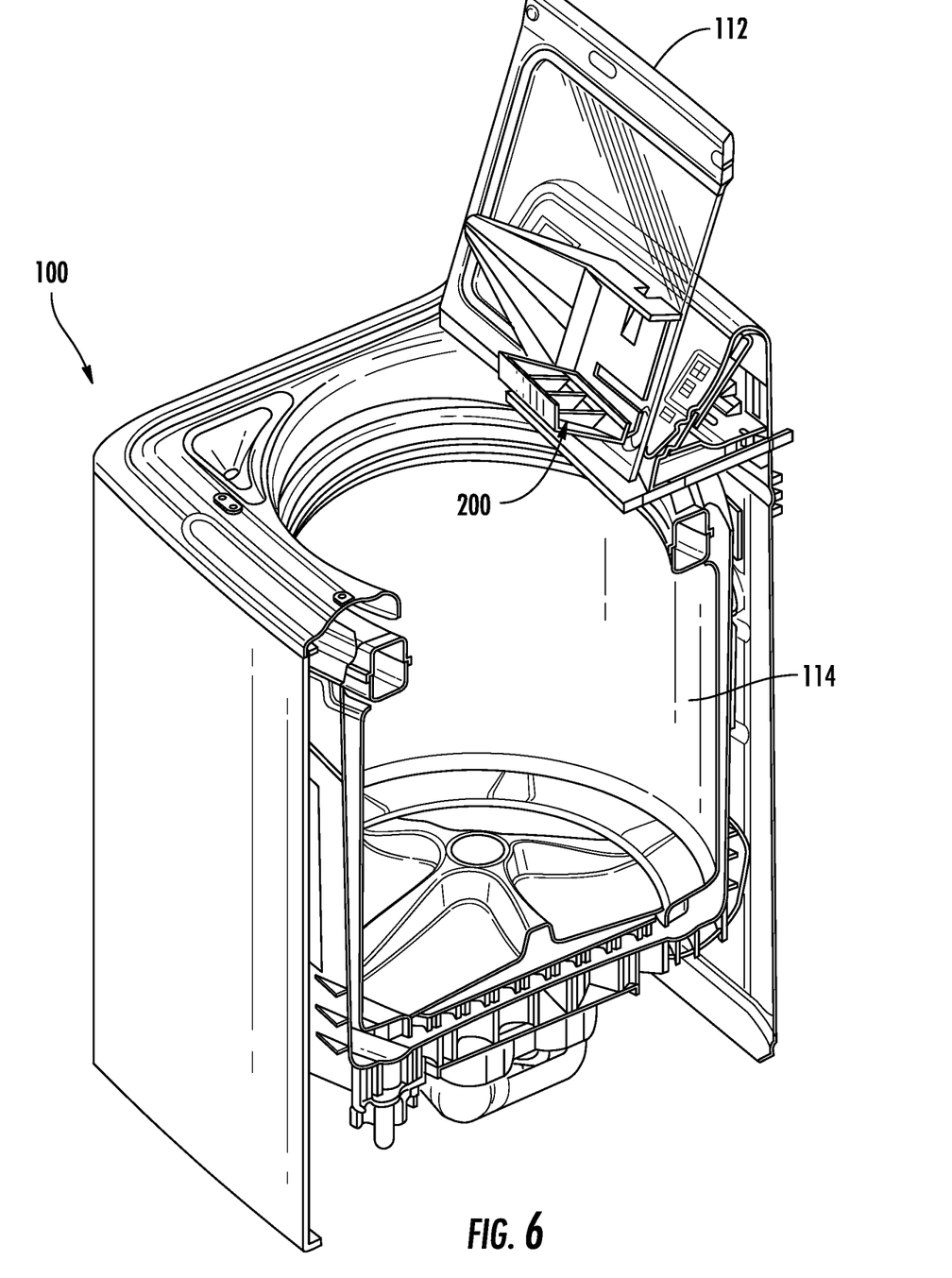
FIG. 6 provides a perspective, cut-away view of an exemplary top-load laundry appliance and filter container according to exemplary embodiments of the present disclosure.

Although laundry appliance 100 is described herein in the context of a front-loading washing machine, this description is provided solely for illustrative purposes. As previously noted, laundry appliance 100 and filter container 200 may be incorporated into a variety of laundry treatment apparatuses. For instance, laundry appliance 100 may be, and filter container 200 may be installed within, a front-load washing machine, a top-loading washing machine, or a combination washing machine and dryer. FIG. 6 provides an alternative embodiment of laundry appliance 100 configured as a top-loading washing machine. As shown, in such embodiments, filter container 200 may be alternatively situated, for example, between door 112 and tub 114. In such a configuration, opening of door 112 enables access to filter container 200 for removal and cleaning of self-clearing filter assembly 208. As shown, filter container 200 may be mounted directly to door 112. In alternative embodiments, filter container may be mounted to tub 114, below door 112.

Figure 7A:
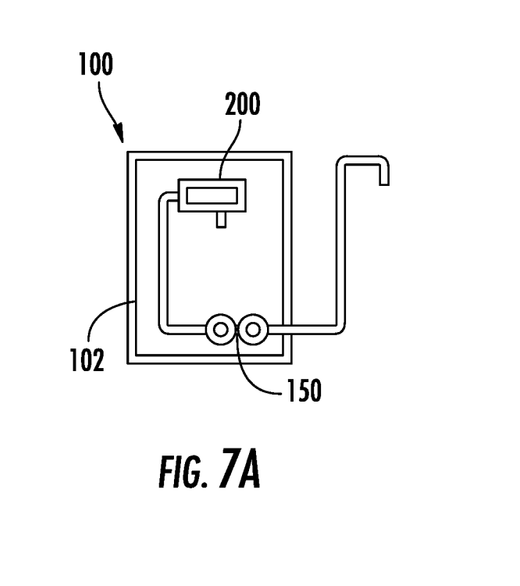
FIG. 7A provides a side schematic view of a mounting location for the filter container relative to the laundry appliance according to exemplary embodiments of the present disclosure.
Figure 7B:
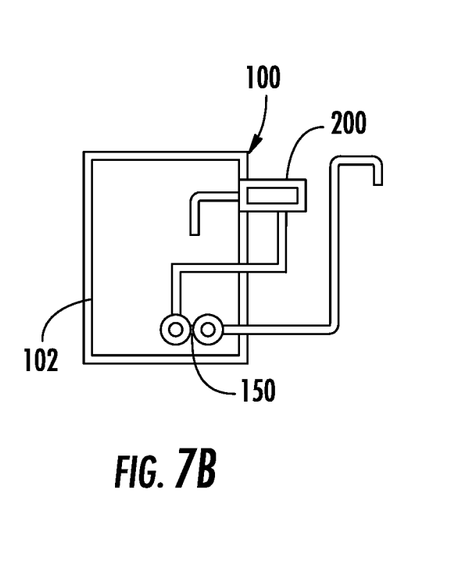
FIG. 7B provides a side schematic view of an alternative mounting location for the filter container relative to the laundry appliance according to exemplary embodiments of the present disclosure.
Figure 7C:
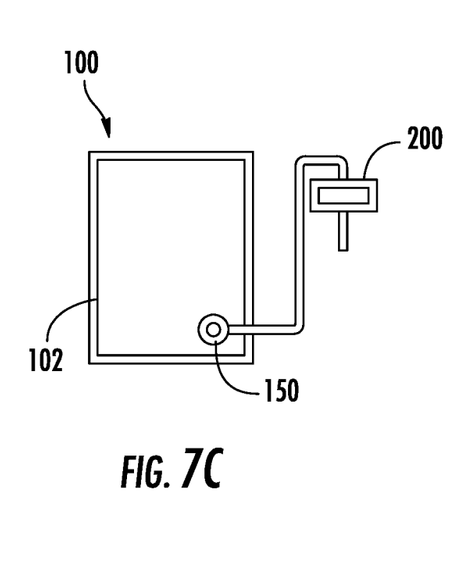
FIG. 7C provides a side schematic view of yet another alternative mounting location for the filter container relative to the laundry appliance according to exemplary embodiments of the present disclosure.

In the preferred embodiment, and as shown in FIGS. 1-2 and 6, filter container 200 is internal to laundry appliance 100, as schematically presented in FIG. 7A. But such location is not intended as a limitation on the present disclosure. In alternative embodiments, filter container 200 may be external to cabinet 200. For example, in the embodiment of FIG. 7B, a soiled fluid volume is motivated by pump 150 outside of cabinet 102 to filter container 200 and drains out of filter container 200 where it is directed back to tub 104 for further use in the washing cycle and recirculation. In still another alternative embodiment, presented schematically in FIG. 7C, pump 150 draws the soiled fluid volume from tub 104 and directs to outside of cabinet 102 to filter container 200. In this embodiment, the fluid volume is not recirculated to tub 104 after filtering, but rather is directed to the attached sewer or septic tank system. In each of the alternative embodiments of FIGS. 7B and 7C, however, the structure and operation of filter container 200 remains the same as previously described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A laundry appliance defining a vertical direction, a lateral direction, and a transverse direction, the laundry appliance comprising:
   a cabinet;
   a tub provided within the cabinet having a tub inlet and a tub outlet;
   a pump in fluid communication with the outlet of the tub for circulating a fluid volume; and
   a filter container comprising
      a filter container inlet in fluid communication with the pump;
      a filter container outlet;
      a filter container base comprising an inclined floor configured such that the fluid volume entering the filter container inlet flows down the inclined floor to the filter container outlet by force of gravity;
      a self-clearing filter assembly for separating microfibers from the fluid volume, the self-clearing filter assembly comprising
         one or more filter side walls forming a side wall perimeter, the one or more side walls having an upper end and a lower end and wherein the perimeter has a substantially uniform height;
         a filter base including
            an upper portion and a lower portion, wherein the upper portion is oriented below the filter container inlet to enable the fluid volume to first contact the filter base at the upper portion of the filter base; and
            a surface attached to the lower end of the one or more side walls and inclined at all points below the upper portion of the filter base such that at least a portion of the fluid volume is capable of flowing over the entire surface of the filter base.

2. The laundry appliance of claim 1, wherein the filter base further comprises a mesh screen.

3. The laundry appliance of claim 1, wherein the self-clearing filter assembly is removable from the filter container.

4. The laundry appliance of claim 3, the filter container further comprising a filter container cover, the filter container cover disposed above the filter container base, the filter container cover and the filter container base defining a volume enclosing the self-clearing filter assembly, and wherein at least a portion of the filter container cover is openable to facilitate removal of the self-clearing filter assembly from the filter container.

5. The laundry appliance of claim 1, wherein the laundry appliance is a front loading washing machine and the filter container is a slidable drawer.

6. The laundry appliance of claim 1, wherein the laundry appliance is a top loading washing machine having a rotatable door above the tub and the filter container is situated between the door and the tub.

7. The laundry appliance of claim 1, wherein the one or more side walls of the filter assembly further comprise a weir on the upper end.

8. The laundry appliance of claim 1, the filter container outlet is in fluid communication with the tub.

9. The laundry appliance of claim 1, wherein the filter container is external to the cabinet during operational use of the laundry appliance.

10. A filter container defining a vertical direction, a lateral direction, and a transverse direction, the filter container comprising:
   a filter container inlet;
   a filter container outlet;
   a filter container base comprising an inclined floor configured such that a fluid volume entering the filter container inlet flows down the inclined floor to the filter container outlet by force of gravity;
   a self-clearing filter assembly for separating microfibers from the fluid volume, the self-clearing filter assembly comprising
      one or more filter side walls forming a side wall perimeter, the one or more side walls having an upper end and a lower end and wherein the perimeter has a substantially uniform height;
      a filter base including
         an upper portion and a lower portion, wherein the upper portion is oriented below the filter container inlet to enable the fluid volume to first contact the filter base at the upper portion of the filter base; and
         a surface attached to the lower end of the one or more side walls and inclined at all points below the upper portion of the filter base such that a least a portion of the fluid volume is capable of flowing over the entire surface of the filter base.

11. The filter container of claim 10, wherein the filter base further comprises a mesh screen.

12. The filter container of claim 10, wherein the self-clearing filter assembly is removable from the filter container.

13. The laundry appliance of claim 12, the filter container further comprising a filter container cover, the filter container cover disposed above the filter container base, the filter container cover and the filter container base defining a volume enclosing the self-clearing filter assembly, and wherein at least a portion of the filter container cover is openable to facilitate removal of the self-clearing filter assembly from the filter container.

14. The filter container of claim 11, wherein one or more of the side walls and the filter base define at least one trough for collecting debris.

15. The filter container of claim 14, wherein the at least one trough is located at the lower portion of the filter base.

16. The filter container of claim 15, wherein the fluid volume pushes debris down the at least one surface of the filter base that is inclined to the at least one trough.

17. The filter container of claim 10, wherein the one or more side walls of the filter assembly further comprise a weir on the upper end.

18. The filter container of claim 10, the filter container outlet is in fluid communication with a tub of a laundry appliance.

19. The filter container of claim 10, wherein the filter container is external to a cabinet of a laundry appliance while the fluid flow passes through the self-clearing filter assembly.

20. The filter container of claim 10, wherein the self-clearing filter assembly in smaller than the filter container base in at least one of the lateral or transverse direction to allow an overflow in the self-clearing filter assembly to spill into the filter container base.

* * * * *